US012537804B2

(12) United States Patent
Gunti et al.

(10) Patent No.: US 12,537,804 B2
(45) Date of Patent: Jan. 27, 2026

(54) AGENT-BASED ESTABLISHMENT OF SECURE CONNECTION BETWEEN ENDPOINTS AND CLOUD SERVERS

(71) Applicant: INFOSYS LIMITED, Bangalore (IN)

(72) Inventors: Subramanya Datta Gunti, Mount Laurel, NJ (US); Balaji Thangavelu, Bengaluru (IN); Manjunath Pandeshwar Krishna, Mount Laurel, NJ (US); Vignesh Ramamurthy, Berwyn, PA (US)

(73) Assignee: Infosys Limited, Bangalore (IN)

( * ) Notice: Subject to any disclaimer, the term of this patent is extended or adjusted under 35 U.S.C. 154(b) by 406 days.

(21) Appl. No.: 17/709,094

(22) Filed: Mar. 30, 2022

(65) Prior Publication Data
US 2023/0319021 A1    Oct. 5, 2023

(51) Int. Cl.
*H04L 9/40*    (2022.01)
*H04L 67/1087*    (2022.01)

(52) U.S. Cl.
CPC ........ *H04L 63/0435* (2013.01); *H04L 63/062* (2013.01); *H04L 63/0876* (2013.01); *H04L 67/1091* (2013.01)

(58) Field of Classification Search
CPC .............. H04L 63/0435; H04L 63/062; H04L 63/0876; H04L 67/1091; H04L 9/00–50;
(Continued)

(56) References Cited

U.S. PATENT DOCUMENTS 7,353,388 B1 *   4/2008   Gilman ................. H04L 9/3273
                                                         713/168
8,645,681 B1 *   2/2014   D'Souza ............... H04L 63/083
                                                         380/278
(Continued)

FOREIGN PATENT DOCUMENTS

IN       202047056733 A      3/2022
WO       2017214821 A1      12/2017
(Continued)

OTHER PUBLICATIONS

India Examination Report Under Sections 12 & 13 of the Patents Act, 1970 and the Patents Rules 2003, dated Jan. 4, 2022.

*Primary Examiner* — Michael W Chao
*Assistant Examiner* — Raghavender Cholleti
(74) *Attorney, Agent, or Firm* — Finnegan, Henderson, Farabow, Garrett & Dunner, LLP

(57) ABSTRACT

A method and/or system for agent-based establishment of secure connection between endpoints and cloud servers is disclosed wherein a deployment information is received at an agent controller comprising information of endpoint and a cloud server for establishing secure connection and monitoring. The endpoint is registered by the agent controller by generating a unique key and authenticating the endpoint using the installed agent causing establishment of dedicated secure channel between the endpoint and the cloud server over a computer network. The connected endpoint may be monitored by the agent controller to collect data and any anomaly may be detected based on the collected data and the detected anomaly may be resolved by the agent controller.

18 Claims, 4 Drawing Sheets

(58) Field of Classification Search
CPC ... H04L 2209/00–88; H04L 63/00–308; H04L 2463/00–146; G06F 21/00–88; G06F 2221/00–2153
See application file for complete search history.

(56) References Cited

U.S. PATENT DOCUMENTS

| | | | |
|---|---|---|---|
| 10,075,437 B1* | 9/2018 | Costigan | H04L 63/166 |
| 2001/0038674 A1* | 11/2001 | Trans | H04L 1/20 |
| | | | 370/503 |
| 2011/0314466 A1* | 12/2011 | Berg | G06F 9/5072 |
| | | | 718/1 |
| 2012/0278878 A1 | 11/2012 | Barkie et al. | |
| 2013/0031037 A1* | 1/2013 | Brandt | H04L 63/1408 |
| | | | 706/12 |
| 2013/0191631 A1* | 7/2013 | Ylonen | H04L 63/164 |
| | | | 713/153 |
| 2016/0057114 A1* | 2/2016 | Unagami | H04W 12/08 |
| | | | 713/171 |
| 2018/0131688 A1* | 5/2018 | Fang | H04L 63/0823 |
| 2020/0057664 A1* | 2/2020 | Durham | G06F 21/53 |
| 2020/0076588 A1* | 3/2020 | Jeon | H04L 63/0846 |
| 2020/0177485 A1* | 6/2020 | Shurtleff | H04L 67/12 |
| 2020/0311289 A1* | 10/2020 | Cooper | G06F 21/602 |
| 2020/0366619 A1* | 11/2020 | Westberg | H04W 28/0247 |
| 2020/0396079 A1* | 12/2020 | Dekant | H04L 9/3236 |
| 2020/0403812 A1* | 12/2020 | Ajitomi | H04L 9/321 |
| 2020/0413249 A1* | 12/2020 | Ramisetty | H04L 63/0853 |
| 2021/0133050 A1* | 5/2021 | Wang | H04L 67/60 |
| 2021/0271777 A1* | 9/2021 | Netsch | G06F 21/6281 |
| 2021/0306308 A1* | 9/2021 | Wu | H04L 63/062 |

FOREIGN PATENT DOCUMENTS

| | | |
|---|---|---|
| WO | 2018024328 A1 | 2/2018 |
| WO | 2019237363 A1 | 12/2019 |

* cited by examiner

AGENT-BASED ESTABLISHMENT OF SECURE CONNECTION BETWEEN ENDPOINTS AND CLOUD SERVERS

This application claims the benefit of Indian Patent Application No. 202241019069, filed Mar. 30, 2022, which is incorporated by reference in its entirety.

FIELD

The present technique relates to Wide Area Network. More specifically, the technique relates to establishing secure cloud connectivity from IoT endpoints.

BACKGROUND

A Software-defined Wide Area Network (SD-WAN) is a virtual WAN architecture that allows enterprises to leverage any combination of communication services—including Multiprotocol Label Switching (MPLS), Long-Term Evolution (LTE) and broadband internet services—to securely connect users to applications. An SD-WAN uses a centralized control function to securely and intelligently direct traffic across the WAN and directly to trusted SaaS and IaaS providers. Currently, SD-WANs are providing connectivity over traditional circuits like Virtual Private Network (VPN) and providing connectivity at branch level such as—branch to branch or branch to data center. In IoT world, operations are decentralized. In industries, remote operations centers are reducing manual operations at the regional facility. If it needs to be centralized and to achieve more innovation, an operational technology (OT) network helps in such scenarios which comprises machines, endpoints, and sensors. Operational technology (OT) is combination of hardware and software that detects or causes a change, through the direct monitoring and/or control of industrial equipment, assets, processes, and events.

Today there is hesitation from industry owners that they don't want to expose machines data on a typical IT network, across the boundary of IoT network and connect through the SD-WAN branch edges and take it to centralized location. For example, in mining industry there will be use of jumbo trucks. Health and safety concern of the equipment used becomes important and monitoring such equipment in an autonomous way is required. OEMs are coming with solutions through usage of sensors and with increased accuracy. A connectivity needs to be built from such trucks all the way to the remote operation center. Such connectivity from trucks to remote operation center cannot be private completely. The connectivity must cross mining sector's private network and service provider public network. Same situation may arise in industries such as health, automotive cars etc. Hence, there is a need of a secure system which can address the above-mentioned problems efficiently.

SUMMARY

Presently, there are no systems which provide secure connection right from the place where data originates at end point level to the remote operation centers say cloud servers. Disclosed are a system, a method and/or a non-transitory computer readable storage medium for agent-based establishment of secure connection between endpoints and cloud servers, according to one or more embodiments. The invention described in the present disclosure provides a secure tunnel built from end point to IOT gateway to application server component, as disclosed in various embodiments of the present disclosure.

In one aspect, a computer implemented method for agent-based establishment of secure connection between endpoints and cloud servers is disclosed. The method comprising, receiving a deployment information at an agent controller, the deployment information comprising information of at least one endpoint and a cloud server for establishing secure connection and monitoring. The at least one endpoint may be one of client devices associated with a user, an Edge gateway device, or a Customer Premise Equipment. The at least one endpoint is registered by the agent controller using an agent installed on the at least one endpoint by generating a unique key for the at least one endpoint through the agent installed on the at least one endpoint based on a unique identifier of the at least one endpoint and authenticating the at least one endpoint using the agent. A secure connection is established between the at least one endpoint and a cloud server by the agent controller, causing the at least one endpoint and the cloud server to connect through a dedicated secure channel over a computer network. The connected at least one endpoint is monitored by the agent controller to collect data from the at least one endpoint, at least one anomaly is detected based on the collected data and the detected at least one anomaly is resolved by the agent controller.

In another aspect, a system for agent-based establishment of secure connection between endpoints and cloud servers is disclosed. The system comprising one or more components, but not limited to a processor, a memory unit operatively coupled to the processor, wherein the processor is configured to receive a deployment information at an agent controller, the deployment information comprising information of at least one endpoint and a cloud server for establishing secure connection and monitoring. The at least one endpoint may be one of client devices associated with a user, an Edge gateway device, or a Customer Premise Equipment. The at least one endpoint is registered by the agent controller using an agent installed on the at least one endpoint by generating a unique key for the at least one endpoint through the agent installed on the at least one endpoint based on a unique identifier of the at least one endpoint and authenticating the at least one endpoint using the agent. A secure connection is established between the at least one endpoint and a cloud server by the agent controller, causing the at least one endpoint and the cloud server to connect through a dedicated secure channel over a computer network. The connected at least one endpoint is monitored by the agent controller to collect data from the at least one endpoint, at least one anomaly is detected based on the collected data and the detected at least one anomaly is resolved by the agent controller.

In yet another aspect, a non-transitory computer readable storage medium for agent-based establishment of secure connection between endpoints and cloud servers is disclosed. The non-transitory compute readable storage medium comprising machine executable code which when executed by at least one processor, causes the at least one processor to perform steps such as, receiving a deployment information at an agent controller, the deployment information comprising information of at least one endpoint and a cloud server for establishing secure connection and monitoring. The at least one endpoint may be one of client devices associated with a user, an Edge gateway device, or a Customer Premise Equipment. The at least one endpoint is registered by the agent controller using an agent installed on the at least one endpoint by generating a unique key for the at least one endpoint through the agent installed on the at least one endpoint based on a unique identifier of the at least one endpoint and authenticating the at least one endpoint using the agent. A secure connection is established between the at least one endpoint and a cloud server by the agent controller, causing the at least one endpoint and the cloud server to connect through a dedicated secure channel over a computer network. The connected at least one endpoint is monitored by the agent controller to collect data from the at least one endpoint, at least one anomaly is detected based on the collected data and the detected at least one anomaly is resolved by the agent controller.

The system, the method, and/or the non-transitory computer readable storage medium disclosed herein may be implemented in any means for achieving various aspects and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Exemplary embodiments are illustrated by way of example and not limitation in the figures of the accompanying drawings, in which like references indicate similar elements and in which.

Figure 1:
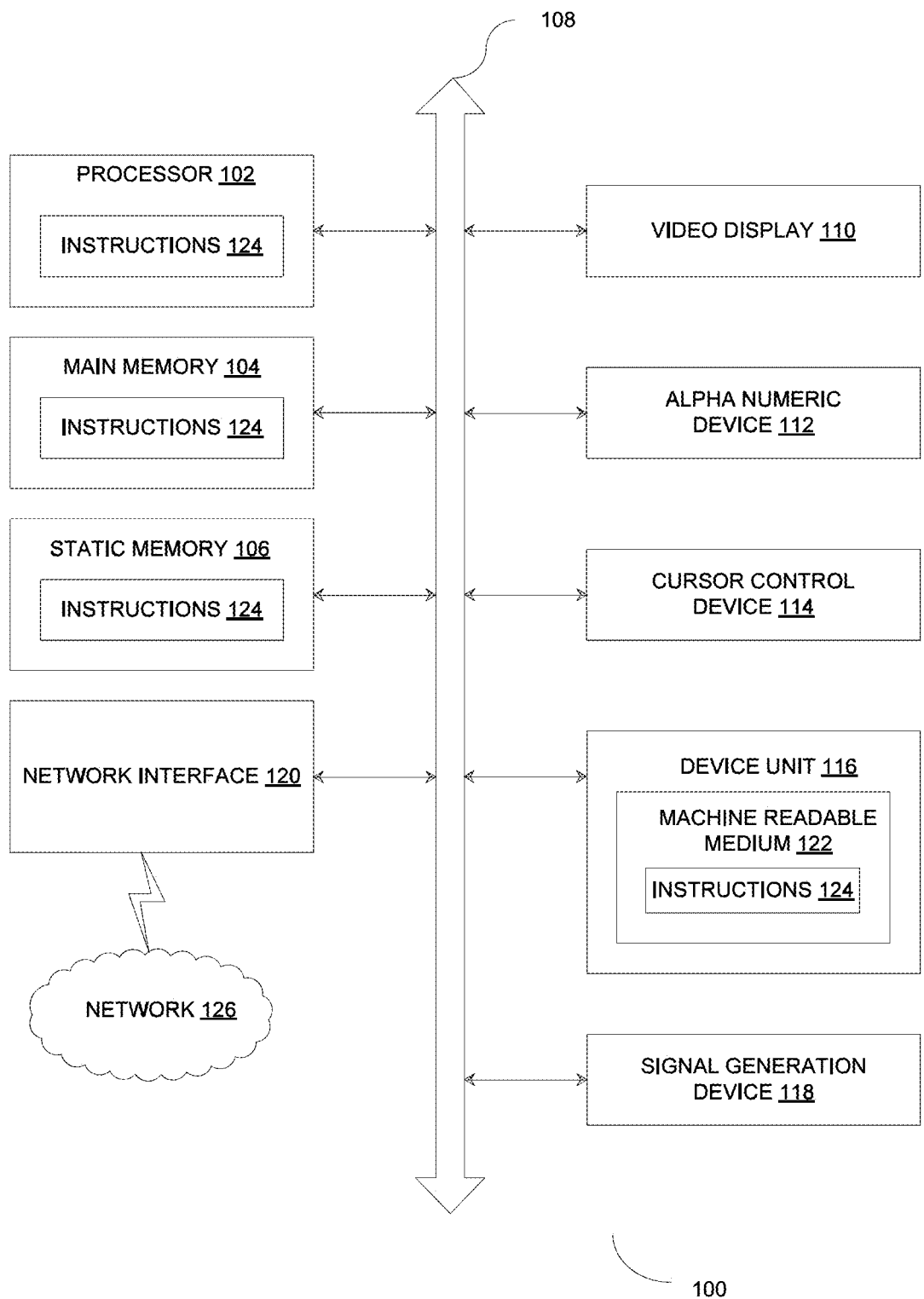
FIG. 1 is a diagrammatic representation of a data processing system capable of processing a set of instructions to perform any one or more of the methodologies herein, according to one or more embodiments.

Other features of the present embodiments will be apparent from the accompanying drawings and from the detailed description that follows.

DETAILED DESCRIPTION

The invention in the present disclosure is aimed to overcome the technical problem mentioned in the background section in the domain of Software-Defined Wide Area and IoT, through a novel system/method for agent-based establishment of secure connection between endpoints and cloud servers, as described in various embodiments of the present disclosure. The examples of the technique described in the present disclosure provide an expandable and secured platform that spans across various cloud infra including private cloud in Data Centers. The exemplary technology described here provides a secure tunnel right from end device/edge device/CPE to cloud in a safe and secured way at line speed. The established secure tunnel is extended to IOT Gateways and provides seamless connectivity to cloud.

The exemplary technique described in the present disclosure enables WAN in minutes by eliminating the need for MPLS/SD-WAN investment, establishes Secured Tunnel from end devices to Cloud with breakout, Quality of service (QOS), Traffic Steering and Throttling capabilities. The system and its components are designed with cloud native design principles and can run on multiple virtualization/cloud platforms. The invention provides Zero Trust Networking with application of Multi Segmented Networking technology. Examples of this technology are agent based which are installed on the End devices (endpoints), Edge Gateway devices and/or Customer Premise Equipment. The architecture has capability of self-heal (AI/ML driven) valuable insights into data usage and performance. Examples of this technology enable Zero Touch Provisioning or self-initiated provisioning, and services may be configured within a very short span of time. The architecture has inbuilt capability to create a WAN across multiple cloud platforms and helps in onboarding any VNF across any of the cloud platforms.

In one or more embodiments, a computer implemented method for agent-based establishment of secure connection between endpoints and cloud servers is disclosed. The method comprising, receiving a deployment information at an agent controller, the deployment information comprising information of at least one endpoint and a cloud server for establishing secure connection and monitoring. The at least one endpoint is one of client devices associated with a user, an Edge gateway device, or Customer Premise Equipment. The at least one endpoint may be registered by the agent controller using an agent installed on the at least one endpoint by generating a unique key for the at least one endpoint through the agent installed on the at least one endpoint based on a unique identifier of the at least one endpoint and authenticating the at least one endpoint using the agent. A secure connection may be established between the at least one endpoint and a cloud server by the agent controller, causing the at least one endpoint and the cloud server to connect through a dedicated secure channel over a computer network. The connected at least one endpoint may be monitored by the agent controller to collect data from the at least one endpoint, at least one anomaly may be detected based on the collected data and the detected at least one anomaly may be resolved by the agent controller.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal display (LCD), Light Emitting Diode (LED) display and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
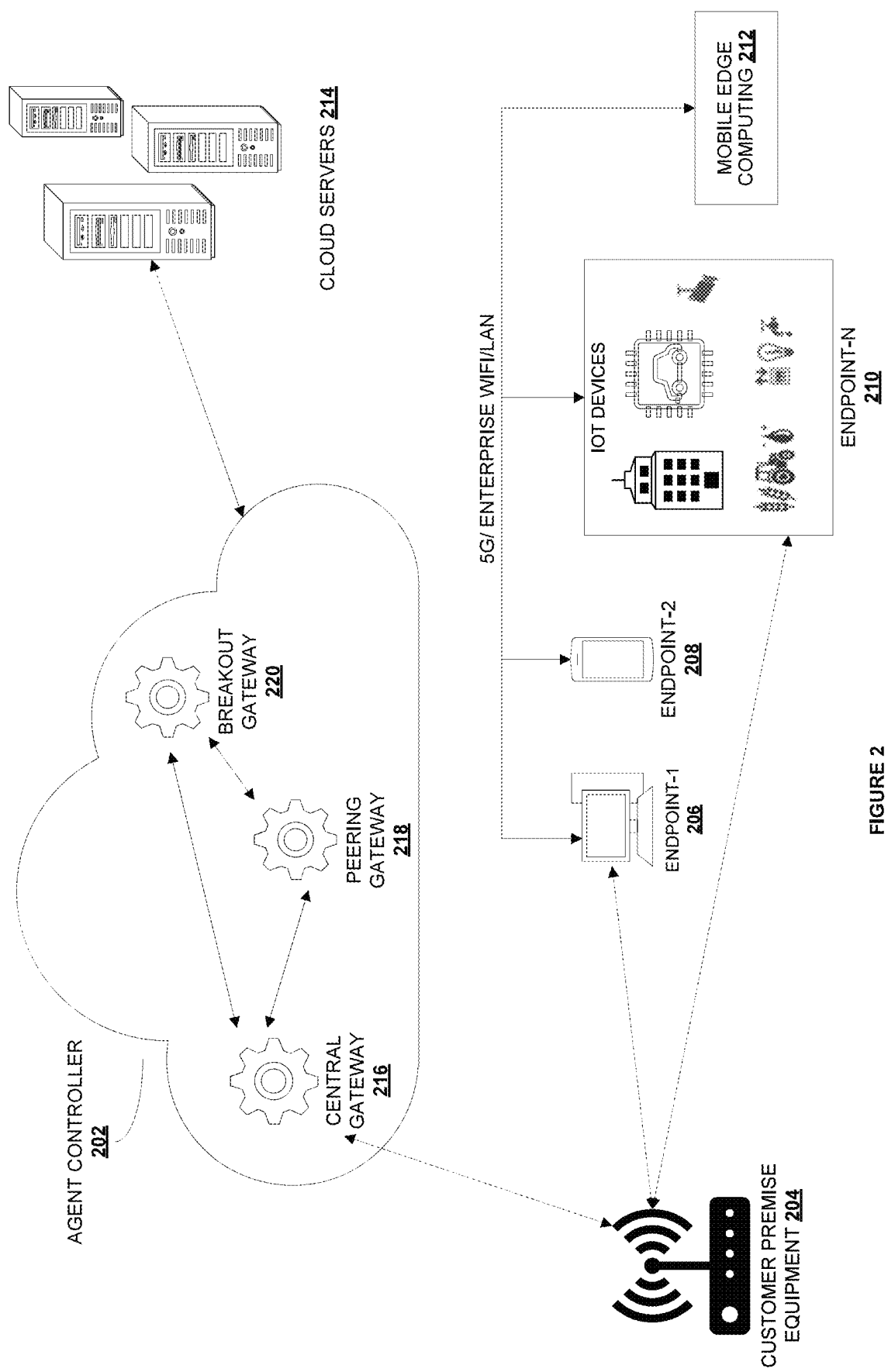
FIG. 2 is an architecture diagram illustrating plurality of components of the system for agent-based establishment of secure connection between endpoints and cloud servers, according to one or more embodiments

FIG. 2 is an architecture diagram illustrating plurality of components of the system for agent-based establishment of secure connection between endpoints and cloud servers, according to one or more embodiments. In one or more embodiments, the system may comprise one or more components such as, but not limited to, an agent controller 202 connected to cloud servers 214 over a computer network, a customer premise equipment 204, an endpoint-1 206, an endpoint-2 208, an endpoint-N 210, mobile edge computing infrastructure 212. The customer premise equipment 204 may be communicatively coupled to the agent controller 202, the endpoint-1 206, the endpoint-2 208 and endpoint-N 210 (IoT devices). In one or more embodiments, the customer premise equipment may also be referred as endpoints and agents may be installed on customer premise equipment 204 as well.

In one or more embodiments, the agent controller 202 may be communicatively coupled to customer premise equipment 204 and communicatively coupled to endpoints through customer premise equipment 204. The agent controller 202 may be configured to establish secure connection using agents installed on the endpoints (206, 208 and 210), route packets between endpoints (206, 208 and 210) and cloud servers 214 through a secure tunnel. In one or more embodiments, the customer premise equipment may also be referred as endpoints and agents may be installed on customer premise equipment 204 as well. The agent controller 202 may comprise components such as central gateway 216, peering gateway 218 and breakout gateway 220. The central gateway 216 may be configured to install and connect all the agents on endpoints. The peering gateway 218 may be configured to have communication and to connect endpoints across various applications deployed across multi cloud architecture (poly cloud architecture). The breakout gateway 220 may be configured to connect the endpoints to outside world (out of enterprise network) through internet.

In one or more embodiments, the customer premise equipment 204 may be any such connected equipment such as modems, CSU/DSUs (Channel Service Unit/Data Service Units), Private Branch Exchanges (PBXs) etc., used by endpoints for accessing internet or generally accessing services on a provider network. The cloud servers 214 may be private cloud and/or public clouds. An organization may have its own private cloud. An exemplary public cloud providers may be AWS, Google, and/or Microsoft. The endpoint-1 206 may be a computing device such as computer, laptops, or workstations. The endpoint-2 208 may be any handheld device associated with a user. The endpoint-N may be any IoT devices that are associated areas of application such as agriculture automation, energy consumption, security and surveillance, building management, embedded mobiles, M2M and wireless sensor network, smart homes, smart cities, telemedicine and healthcare etc. A mobile edge computing infrastructure 212 may also be communicatively coupled to the agent controller 202, which may act as an agent controller 202 wherein the central gateway 216, peering gateway 218 and breakout gateway 220 may be hosted on edge network of the mobile edge computing infrastructure 212.

In one or more embodiments, the agent controller 202 may be configured to receive input data through a user interface associated with the agent controller 202. Also, the user interface may prompt the user to provide information such as login credentials of the user to login. The input data may comprise list of cloud servers and information of the cloud servers for establishing secure connection, list of end points/end devices to be installed and information associated with the endpoints/end devices and/or docker image list to be deployed on the cloud servers. The information associated with the cloud servers may comprise metadata indicating cloud names, docker images (application images indicating which application is running on the cloud), identity of the agents installed on the cloud and one or more pre-defined policies/rules for managing the network traffic. The information associated with the endpoints may comprise information such as vendor name of the endpoints, software version and/or agent ID. The docker image list may comprise information such as software vendor name, software version, corresponding docker image and software download link. The docker image is a containerized software provided by different application vendors. With the information received from the user interface, the agent controller 202 may register the endpoints, connect the endpoints to cloud servers by establishing a secure connection and monitor the connected endpoints.

In order to register an end point, the agent controller 202 may generate a unique key for each of the endpoints based on the information provided by the user. The agent registration is performed using the MAC address followed by the unique key. If MAC address of the endpoints is available, the agent controller 202 may generate an unique key for the endpoints, If MAC address of the endpoints is not available, then a temporary key may be generated using the IP address information of the endpoints and when the connection is established, a MAC address of the endpoints may be accessed and then a new unique key may be generated by the agent controller to identify the endpoints uniquely. An agent associated with one endpoint cannot be used on another endpoint as the registration is based on MAC address. The agent controller 202 may check whether all traffic from the endpoints may be sent to the tunnel or to a specific port. One or more traffic policies are defined at the agent controller 202 and the agents installed on the endpoints may steer the traffic based on the traffic rules as implemented by the agent controller 202. Based on the endpoint information and the unique key generated for each of the endpoints, an agent may be installed by the agent controller 202 on each of the endpoints. An agent is a software component that runs on the endpoints to interact with the agent controller 202 to connect to cloud servers 214 securely. The unique key generated by the agent controller 202 may be communicated to the agents installed on the endpoints 206, 208 and 210. As the agents are installed on the endpoints 206, 208 and 210, based on the cloud server information provided by the user the agent controller 202 may establish secure connection between the endpoints 206, 208 and 210 and the cloud servers 214 using the agent installed on the endpoints 206, 208 and 210 using unique key assigned to each of the endpoints 206, 208 and 210. As the connection is based on the unique key based on MAC address, even in case of change of network to which the endpoints 206, 208 and 210 remain connected, the secure connection will remain intact thereby eliminating the manual intervention.

In one or more embodiments, central gateway 216 may be configured to manage all the endpoints connected to the cloud servers through agent controller 202. The central gateway may comprise a display unit which displays details of all the devices/endpoints such as, device ID, port type, status of security breach etc. The peering gateway 218 may be configured to communicate between gateways. For example, if a user is accessing a service from Google Cloud and needs to switch to Amazon Web Services (AWS) and in such instances the peering gateway 218 switches the connection. In cases where the user needs to move out of secure network and join the public network/world, the breakout gateway 220 may be configured to execute such breakout to different network by the endpoints.

Figure 2A:
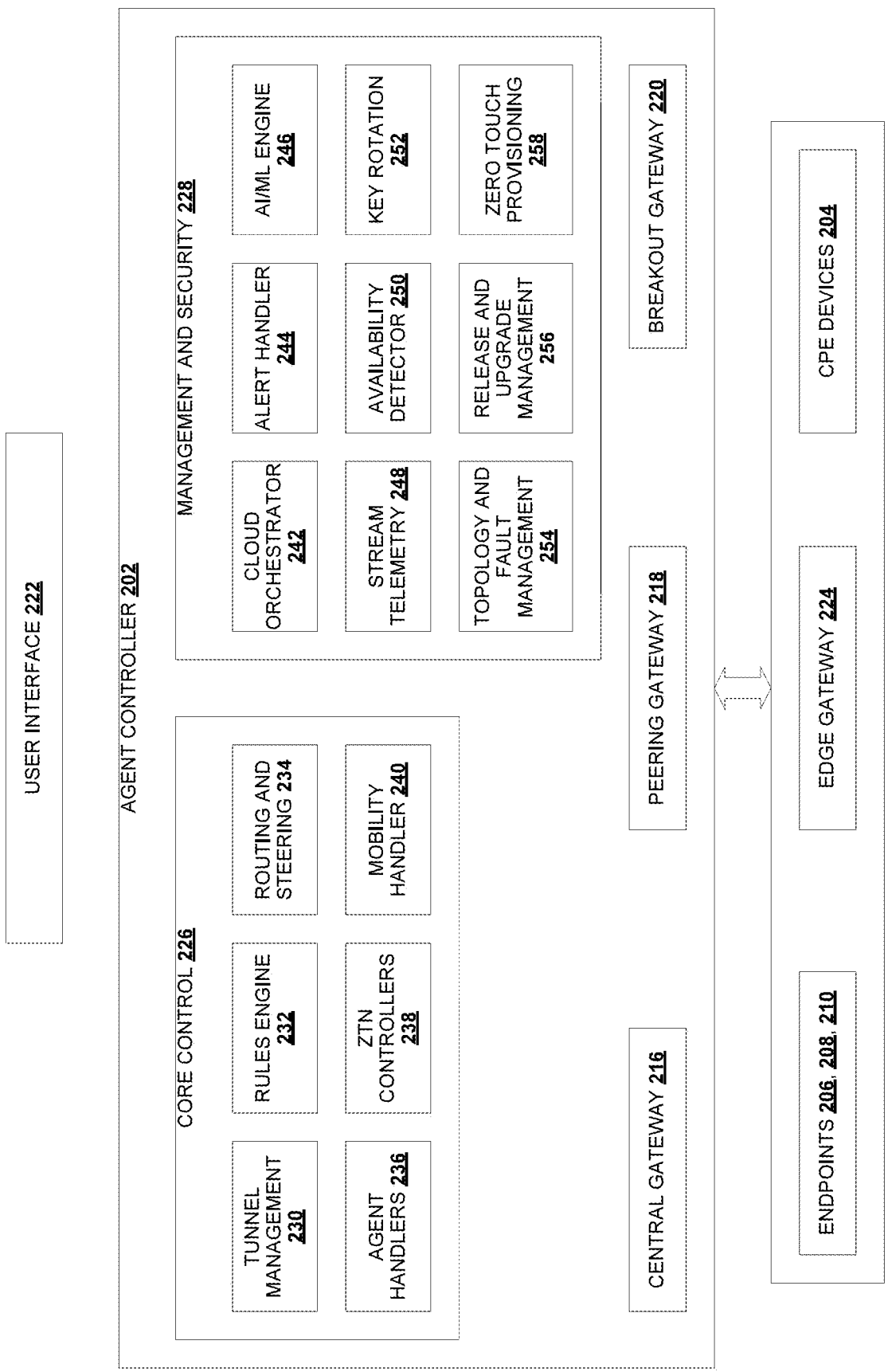
FIG. 2A is an architecture diagram illustrating various components of the system for agent-based establishment of secure connection between endpoints and cloud servers, according to one or more embodiments.

FIG. 2A is an architecture diagram illustrating various components of the system for agent-based establishment of secure connection between endpoints and cloud servers, according to one or more embodiments. In one or more embodiments, the system may comprise agent controller 202, user interface 222, endpoints 206, 208 and 210, edge gateway 224 and Customer Premise Equipment devices 204. The agent controller 202 may comprise one or more components such as central gateway 216, peering gateway 218 and breakout gateway 220, core control module 226 and management and security module 228.

The core control module 226 may comprise one or more components such as, but not limited to, a tunnel management module 230, a rules engine 232, a routing and steering engine 234, an agent handler 236, a Zero Trust Networking controller 238, and a mobility handler 240. The management and security module 228 may comprise one or more components such as, but not limited to, a cloud orchestrator 242, an alert handler 244, an AI/ML engine 246, a stream telemetry module 248, an availability detector 250, a key rotation module 252, a topology and fault management engine 254, a release and upgrade management engine 256, and a zero-touch provisioning module 258.

In one or more embodiments, the tunnel management module 230 may be configured to define and store the traffic rules for the connection between endpoints 206, 208 and 210 and cloud servers 214. The rules engine 232 may be configured to assign IP addresses, unique key, port number to the endpoints 206, 208 and 210 to establish secure connection. As soon as agent gets connected when endpoints 206, 208 and 210 are connected to the network, the rules engine 232 cerates and stores information of IP address which may be assigned to the endpoints, and which is its own internal IP i.e., as the endpoints 206, 208 and 210 are identified using MAC address or unique ID, the rules engine 232 cerates private IP addresses for each of the endpoints 206, 208 and 210 that are connected to the network. The routing and steering engine 234 may be configured to decide how to communicate and how to route data packets to endpoints 206, 208 and 210 with different IP addresses. The routing and steering engine 234 may also store information on whether the routing and connection is port specific, or all the ports are used for data transfer. The agent handler 236 may be configured be in communication with the agents installed on the endpoints 206, 208 and 210 so that necessary information when required by the other modules of the agent controller 202 may be fetched from the endpoints 206, 208 and 210 through agents. The Zero Trust Networking controller 238 may be configured to perform integration required with other enterprise network security products in the environment which is implementing Zero Trust security policies. The Zero Trust Networking controller 238 may perform policy management and propagation and allows integration of security elements, connection policies which are enforced to agents. The mobility handler 240 may be a module for mobile devices (one of the type of endpoints, say endpoint-2 208) for agent specific nuances which helps to address connectivity with agents on the mobile devices (mobile endpoints) with information such as a mobile operating system (OS), OS version, Mobile Device Management (MDM) client, Virtual Private Network (VPN) requirement etc. and enables secure connectivity with mobile endpoints.

The cloud orchestrator 242 may be configured to install, control and/or maintain cloud-based applications and scaling/performances. The alert handler 244 may be configured to detect any anomaly or unwanted scenarios and may define system outage condition and implements alert mechanism such as alerting the user when there an anomaly is detected. The alert hander 244 may parse the log files which are collected and stored as a part of monitoring by the agent controller and may detect the deviations from the pre-defined functionality of network components such as non-functioning of network components, denial of service attacks etc. The AI/ML engine 246 may be configured to predict possible issue that may occur based on pattern analysis of data collected over a period and auto resolution of the issues. If the auto resolution of issue is not pre-defined that the AI/ML engine 246 may notify the user through one or more alert notifications.

In one or more embodiments, when the endpoints are connected, the agent controller 202 may monitor the endpoints centrally. As a part of monitoring, the data may be collected from the endpoints indicating the connection status and working status of the endpoints using respective APIs. The stream telemetry module 248 may be configured to collect data from the endpoints 206, 208 and 210 indicating statistics at the endpoints periodically through the agent installed on the endpoints and the agent handlers 236. The stream telemetry module 248 may collect data in the form of PUSH and PULL requests. The data may also be collected as event-based activity i.e., on the occurrence of any pre-defined events such as loss in connection, non-working of any micro-services, a corresponding data may be pushed to centralized location i.e., the agent controller 202. Whenever the internet is down or one of the agents is down, the availability detector 250 may be configured to detect the downtime and may auto correct (ex. bring the agent up) based on rules.

The key rotation module 252 may be configured to update keys on regular basis to keep the keys secure. The topology and fault management engine 254 may be configured to keep track of the overall network and to identify the network issues. The release and upgrade management engine 256, may be configured to push the auto updates to the agents. The zero-touch provisioning module 258 may be configured to install software agents at the endpoints without human intervention or optionally by the user without the assistance from the operations team by way of plug and play method.

For establishing the connection, the software agents installed on the endpoints perform the initial handshake to connect to the cloud server. If a connection needs to be established, for example, from Agent-1 in one location to Agent-2 in another location, initial handshake happens with the controller. The connection between Agent-1 to Agent-2 maybe a P2P session but monitored and statistics are captured by the agent controller 202 continuously. If a connection needs to be disconnected and delete all required agents, the teardown process may be performed by the agent controller 202. As discussed in preceding paragraphs, the agent controller 202 is configured to perform agent registration, establishment of session, monitoring of end points and teardown process. For the system to run, the application which provide services may be installed either on the data centers or the cloud infrastructures.

In an exemplary embodiment, if an application is hosted on Amazon Elastic Compute Cloud (EC2) server by an enterprise, based on the server type, the application may not be exposed to outside world. Also, the enterprise needs to access the enterprise network. The enterprise may install the required number of agents on the endpoints, say five in numbers, and only these 5 agents will be able to access the server. The installed 5 agents may be provided with unique keys by the agent controller 202. Once the agents are installed on the endpoints, all the agents can access only to that cloud server where application is hosted through central gateway 216. If an agent needs to connect to other cloud servers, the agent may request the agent controller 202 and then the breakout gateway 220 may process the breakout request, post which the agent will be able to access applications on other cloud servers. The remaining agents continue with the existing connection through central gateway 216. In a situation where there is a requirement to isolate endpoints completely from outside world/network or may be a situation where there is requirement to isolate only few ports and, in such instances peering gateway may be configured to perform required isolation. The user interface 222 comprise a dashboard which may be configured to display the telemetry information such as list of agents installed on the endpoints 206, 208 and 210 that are registered with the agent controller 202, how many packets have been passed from each agent etc.

The system described in the present disclosure is elastic to an extent that there is no limit for number of secure tunnel endpoints. In case of SDWAN, the tunnel starts at the Edge and terminates at the other side of the Edge/data center or branch. The advantage with technology in the present disclosure is that the tunnel can be stretched till the endpoints and to is scalable to plurality of endpoints.

Figure 3:
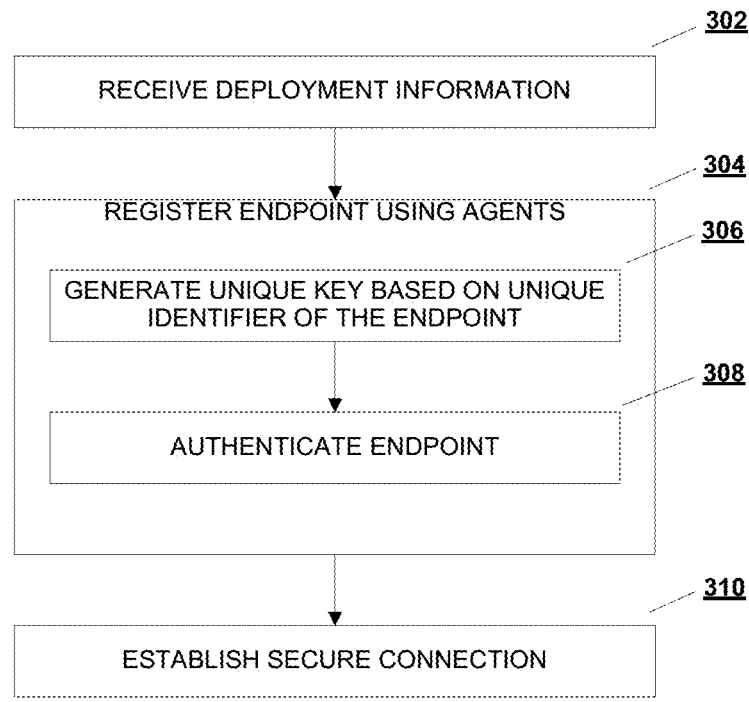
FIG. 3 is a process flow diagram illustrating sequence of steps executed by the system for agent-based establishment of secure connection between endpoints and cloud servers, according to one or more embodiments.

FIG. 3 is a process flow diagram illustrating sequence of steps executed by the system for agent-based establishment of secure connection between endpoints and cloud servers. In one or more embodiments, the system performs the steps comprising receiving a deployment information at an agent controller, as in step 302. The deployment information may comprise information of one or more endpoints and one or more cloud servers for establishing secure connection and monitoring and the deployment information may comprise list of cloud servers, information of the cloud servers for establishing secure connection, list of end points/end devices to be installed and information associated with the endpoints/end devices and/or docker image list to be deployed on the cloud servers. The information of the cloud servers may comprise metadata indicating cloud names, docker images (application images indicating which application is running on the cloud), identity of the agents installed on the cloud and one or more pre-defined policies/rules for managing the network traffic. The information associated with the endpoints may comprise information such as vendor name of the endpoints, software version and/or agent ID. The docker image list may comprise information such as software vendor name, software version, corresponding docker image and software download link. The docker image is a containerized software provided by different application vendors. The one or more endpoints may be at least one or combination of client devices associated with a user, an Edge gateway device, or Customer Premise Equipment. The client devices associated with the user may be any endpoints/end devices such as, but not limited to, computers, mobiles, handheld devices and any other computing devices that are capable of processing instructions and able to connect to computer network. The Edge gateway devices may be any network devices that have immediate or direct connection to the Internet or an external non-propriety network, for example, Edge switches, routers, multiplexers, and other WAN devices. The Customer Premise Equipment (CPE) be any such connected equipment such as modems, CSU/DSUs (Channel Service Unit/Data Service Units), Private Branch Exchanges (PBXs) etc., used by endpoints for accessing internet or generally accessing services on a provider network.

The at least one endpoint may be registered by the agent controller using an agent installed on the at least one endpoint, as in step 304. An agent is a software component that may be installed on the endpoints through which the endpoints may communicate with respective cloud servers or data centers. With the technology described in the present disclosure, it is possible to achieve communication between endpoints and the cloud servers without impacting the endpoints, without impacting ant third party vendors like SDWAN, without modifying any of the WAN and/or without any hardware changes in network components. In order to register the endpoint an agent (also referred as software agent) may be installed on the endpoints using which the communication to cloud serves is achieved. Using the agent installed on the endpoints, the MAC address or unique device ID or any such unique identifier associated with the endpoint may be communicated by the agent to the agent controller. The agent controller may generate a unique key by method of AES encryption using the combination of device type, MAC address of the endpoint through the agent installed the one endpoint based on a unique identifier of the endpoint, as in step 306. Based on the unique key, on successful exchange of keys and responses between agent at the endpoint and the cloud server, a unique Session ID will be created which may establish the secure connection/session and the endpoint may be authenticated as in step 308 using the agent by the agent controller. The unique key that is generated by the agent controller may be stored securely with the agent controller and is also share with the cloud server for authentication of the endpoints. A secure connection may be established between the endpoint and a cloud server by the agent controller, as in step 310, causing the endpoint and the cloud server to connect through a dedicated secure channel over a computer network. The secure here indicates that the endpoint is not detectable by the outside world/network and there is a dedicated connection between the endpoint and the cloud server to which the endpoint is connected. If there are more than one endpoint, each endpoint may not communicate to each other without the agent controller facilitating the communication.

In one or more embodiments, each of the endpoints that are connected to agent controller are centrally monitored by the central gateway of the agent controller. The central gateway maintains the list of all the endpoints that are connected, with necessary information such as—connected cloud server, IP address, MAC address, port number etc. The central gateway central may comprise a display screen which displays all the devices that are connected in our network with information such as—what type of ports opened, is there any security breach or not etc. The connected endpoints may be monitored by the agent controller/central gateway to collect data from the endpoints. The collected data is compared with the pre-defined behaviour of the endpoints by an AI/ML component of the agent controller to detect one or more anomalies in the functioning of the endpoints. The pre-defined behaviour of the endpoints may be in terms of threshold values indicting healthy function of the endpoints. If there are any anomalies detected based on the collected data, the detected at least one anomaly may be resolved by the agent controller by way of pre-defined scripts which are executed to bring the endpoints back to the healthy state.

In one or more embodiments, the user may select a cloud sever and deploy the gateway on the selected cloud server and connect any number of devices/endpoints to the gateway. The end-to-end connection is secured, and the branch may be optional. A peering gateway may be added whenever required and may be interconnected.

In one or more embodiments, a non-transitory computer readable storage medium for agent-based establishment of secure connection between endpoints and cloud servers is disclosed. The non-transitory compute readable storage medium comprising machine executable code which when executed by at least one processor, causes the at least one processor to perform steps such as, receiving a deployment information at an agent controller, the deployment information comprising information of at least one endpoint and a cloud server for establishing secure connection and monitoring. The at least one endpoint is one of client devices associated with a user, an Edge gateway device, or Customer Premise Equipment. The at least one endpoint may be registered by the agent controller using an agent installed on the at least one endpoint by generating a unique key for the at least one endpoint through the agent installed on the at least one endpoint based on a unique identifier of the at least one endpoint and authenticating the at least one endpoint using the agent. A secure connection may be established between the at least one endpoint and a cloud server by the agent controller, causing the at least one endpoint and the cloud server to connect through a dedicated secure channel over a computer network. The connected at least one endpoint may be monitored by the agent controller to collect data from the at least one endpoint, at least one anomaly may be detected based on the collected data and the detected at least one anomaly may be resolved by the agent controller.

Advantage of the technique described in the present disclosure is that the system is elastic in nature i.e., secure connectivity right from the end point and elasticity to whichever the application that we want the connection can be extended till the endpoints (IoT devices). The system is agent based and processes and applications can be seamlessly onboarded.

The specification and drawings in the present disclosure are to be regarded in an illustrative rather than a restrictive sense.

We claim:

1. A computer implemented method for agent-based establishment of secure connection between endpoints and cloud servers, comprising:
   receiving, at an agent controller, deployment information associated with a set of endpoints and a cloud server, wherein each endpoint is one of a client device associated with a user, an Edge gateway device, or a Customer Premise Equipment, wherein the deployment information comprises a set of application images indicative of an application running on the cloud server, and wherein the deployment information further comprises a docker image list to be deployed on the cloud server;
   registering, by the agent controller, the set of endpoints using an agent on each endpoint, wherein the agent is a software component configured to be installed on each endpoint to enable each endpoint to communicate with cloud servers, and wherein the registration of each endpoint comprises:
      generating, by the agent controller, a unique key for the endpoint based on a unique identifier of the endpoint, wherein the unique identifier corresponds to a media access control (MAC) address or an internet protocol (IP) address of the endpoint,
      installing, by the agent controller, the agent on the endpoint based on the generated unique key,
      communicating, by the agent controller, the generated unique key to the installed agent, and
      authenticating, by the agent controller, the endpoint using the installed agent; and
   establishing, by the agent controller, based on the deployment information, the installed agent on each endpoint, and the unique key for each endpoint, a secure connection between each endpoint and the cloud server causing each endpoint and the cloud server to connect through a dedicated secure channel over a computer network.

2. The computer implemented method of claim 1, further comprising:
   monitoring, by the agent controller, each connected endpoint to collect data from the endpoint;
   detecting, by the agent controller, at least one anomaly based on the collected data, wherein the collected data is indicative of a connection status and working status of each endpoint; and
   automatically resolving, by the agent controller, the detected at least one anomaly by executing pre-defined scripts to bring at least one affected endpoint to a healthy state.

3. The computer implemented method of claim 1, wherein the deployment information further comprises a list of the set of endpoints, information associated with the set of endpoints, and metadata associated with the cloud server for establishing secure connection and monitoring.

4. The method of claim 1, further comprises generating, by the agent controller, the unique key for the endpoint based on a unique identifier of the endpoint using an Advanced Encryption Standard (AES) encryption algorithm based on a combination of device type and MAC address of the endpoint.

5. The method of claim 1, wherein the unique key for each endpoint is updated periodically using a key rotation module.

6. The method of claim 1, wherein installing the agent on the endpoint based on the generated unique key further comprises installing the agent on the endpoint by performing zero-touch provisioning.

7. The method of claim 1, further comprising facilitating, by the agent controller, secure communication between endpoints connected to different cloud service providers using a peering gateway.

8. The method of claim 1, further comprising detecting and resolving, by the agent controller, network issues affecting secure connection using a topology and fault management engine.

9. The method of claim 1, further comprising automatically deploying, by the agent controller, software updates to each agent using a release and upgrade management engine.

10. The method of claim 1, further comprising integrating, by the agent controller, external enterprise security products for enforcing zero trust policies.

11. The method of claim 1, further comprising displaying status of each connected endpoint, security breach alerts, and port status.

12. The method of claim 1, further comprising isolating, by the agent controller, specific endpoints from external networks using a breakout gateway.

13. A system for agent-based establishment of secure connection between endpoints and cloud servers, comprising:
a processor;
a memory unit operatively coupled to the processor, having instructions stored thereon that when executed by the processor, causes the processor to:
receive deployment information associated with a set of endpoints and a cloud server, wherein each endpoint is one of a client device associated with a user, an Edge gateway device, or a Customer Premise Equipment, wherein the deployment information comprises a set of application images indicative of an application running on the cloud server, and wherein the deployment information further comprises a docker image list to be deployed on the cloud server;
register the set of endpoints using an agent on each endpoint, wherein the agent is a software component configured to be installed on each endpoint to enable each endpoint to communicate with cloud servers, and wherein for the registration of each endpoint the execution of the stored instructions further causes the processor to:
generate a unique key for the endpoint based on a unique identifier of the endpoint, wherein the unique identifier corresponds to a media access control (MAC) address or an internet protocol (IP) address of the endpoint,
install the agent on the endpoint based on the generated unique key,
communicate the generated unique key to the installed agent, and
authenticate the endpoint using the installed agent; and
establish, based on the deployment information, the installed agent on each endpoint, and the unique key for each endpoint, a secure connection between each endpoint and the cloud server causing each endpoint and the cloud server to connect through a dedicated secure channel over a computer network.

14. The system of claim 13, the execution of the stored instructions further causes the processor to:
monitor each connected endpoint to collect data from the endpoint;
detect at least one anomaly based on the collected data, wherein the collected data is indicative of a connection status and working status of each endpoint; and
automatically resolve the detected at least one anomaly by executing pre-defined scripts to bring at least one affected endpoint to a healthy state.

15. The system of claim 13, wherein the deployment information further comprises a list of the set of endpoints, information associated with the set of endpoints and information associated with the cloud server for establishing secure connection and monitoring.

16. A non-transitory computer readable medium having stored thereon instructions for agent-based establishment of secure connection between endpoints and cloud servers, the non-transitory computer readable medium comprising machine executable code which when executed by a processor, causes the processor to perform steps comprising:
receiving deployment information associated with a set of endpoints and a cloud server, wherein each endpoint is one of a client device associated with a user, an Edge gateway device, or a Customer Premise Equipment, wherein the deployment information comprises a set of application images indicative of an application running on the cloud server, and wherein the deployment information further comprises a docker image list to be deployed on the cloud server;
registering the set of endpoints using an installed agent on each endpoint, wherein the agent is a software component configured to be installed on each endpoint to enable each endpoint to communicate with cloud servers, and wherein for the registration of each endpoint the execution of the machine executable code further causes the processor to perform steps comprising:
generating a unique key for the endpoint based on a unique identifier of the endpoint, wherein the unique identifier corresponds to a media access control (MAC) address or an internet protocol (IP) address of the endpoint,
installing the agent on the endpoint based on the generated unique key,
communicating the generated unique key to the installed agent, and
authenticating the endpoint using the installed agent; and
establishing, based on the deployment information, the installed agent on each endpoint, and the unique key for each endpoint, a secure connection between the endpoint and the cloud server causing each endpoint and the cloud server to connect through a dedicated secure channel over a computer network.

17. The non-transitory computer readable medium of claim 16, wherein the machine executable code when executed by the processor further causes the processor to perform steps comprising:
monitoring each connected endpoint to collect data from the endpoint;
detecting at least one anomaly based on the collected data, wherein the collected data is indicative of a connection status and working status of each endpoint; and
automatically resolving the detected at least one anomaly by executing pre-defined scripts to bring at least one affected endpoint to a healthy state.

18. The non-transitory computer readable medium of claim 16, wherein the deployment information further comprises a list of the set of endpoints, information associated with the set of endpoints and information associated with the cloud server for establishing secure connection and monitoring.

\* \* \* \* \*